March 22, 1960 — R. W. HYDE — 2,929,075
FOOD PREPARATION WORK UNIT
Filed Oct. 5, 1956 — 3 Sheets-Sheet 1

INVENTOR:
Robert W. Hyde
BY
Daniel H. Dunbar
ATTORNEY

March 22, 1960  R. W. HYDE  2,929,075
FOOD PREPARATION WORK UNIT
Filed Oct. 5, 1956  3 Sheets-Sheet 3

INVENTOR:
Robert W. Hyde
BY
Daniel H. Dunbar
ATTORNEY

United States Patent Office 2,929,075
Patented Mar. 22, 1960

2,929,075

FOOD PREPARATION WORK UNIT

Robert W. Hyde, Cincinnati, Ohio, assignor to American Radiator & Standard Sanitary Corporation, New York, N.Y., a corporation of Delaware Application October 5, 1956, Serial No. 614,151

6 Claims. (Cl. 4—187)

This invention relates to a new food preparation work unit and more particularly to a type of food preparation work unit especially developed for convenience of use and ease of installation.

Food preparation in both domestic and commercial kitchens has many distinct aspects and utilizes numerous forms of equipment. Certain types of foodstuffs, particularly fresh produce and the like, require cleaning and trimming or cutting operations preparatory to cooking or serving. The type of work center used during the performance of such food preparation steps usually is provided with an adequate work surface together with water supply means and drain facilities.

In some cases the work surface portion may be the sink drainboard of a conventional sink unit; alternately, a work surface in the form of a cabinet counter-top adjoining the sink unit might be employed. Such work surfaces are usually located at "counter-top" height and thus are convenient to a person working in a standing position thereat. However, convenience ends at this point.

Use of a sitting position at such work-center units is impractical; the supporting cabinet structure of the counter-top or sink-top or the front apron of a sink has a vertical face, flush with or inadequately recessed with respect to its front edge, which does not provide sufficient knee clearance. A person working from a sitting position and facing such a facility must over-extend his position to one of awkwardness.

In the situation where the sink unit drainboard might be employed for food preparation duties an important inconvenience often is experienced. On occasion, when the sink bowl is being utilized for a specific purpose, there is a likelihood that drain water or prepared foodstuffs on the drainboard will undesirably pass into the sink bowl. Such conditions must be avoided in some manner and this causes a further inconvenience.

When an adjoining counter-top is used for a work surface, inherent draining facilities are totally lacking because of levelness. The supply of water available is not always most conveniently located. Further, the surfaces of said drainboards and counter-top work areas are not always equally well suited to the performance of all washing, rinsing, and cutting operations; the counter-top may be resilient and suitable for being cut upon but the sink drainboard is generally very hard and unsuitable for this purpose. The latter is usually manufactured of metal either with or without a porcelain enamel finish.

Table-top surfaces, removed from the conventional sink unit, may be used for the performance of the aforementioned food preparation duties. However, even though convenient for use by a person working in either a sitting or standing position, they offer no additional advantages. Neither water supply nor drain-off features are immediately available and the inconvenience of having to work away from such facilities is most pronounced.

On occasion the bottom of the bowl of the sink is used as a work surface. Although it does have an inherent draining advantage, the surface is at a most inconvenient height and its use as a work surface by a person either standing or sitting is not optimumly efficient. In some cases such use is not even feasible.

The food preparation work facilities above mentioned are usually additionally deficient with respect to the matter of disposal of food waste matter. The use of separate and nearby food waste receptacles for temporary storage is well known; more lately food waste comminuting units, directly associated with a building drain, have been found to be a highly desirable and acceptable solution to the disposal problem.

Use of such comminuting units has always been advocated with respect to the drain of conventional sink units even though such is not the most efficient type of installation for a unit of this nature. The inlet to the comminuting unit corresponds in location to the drain outlet of the sink. The sink bowl bottom surface, as a work surface, is not conveniently located as to persons working in either a standing or sitting position and suitable adjoining work surfaces are not convenient to the food waste inlet of the comminuting and disposer unit.

Use of the sink bowl for certain of its intended functions may, at times, interfere with immediate use of the comminuting and disposer unit for its intended function. For instance, a disposal unit becomes inoperative if the sink bowl has water stored therein for a specific purpose. Hence this arrangement does not permit of the maximum freedom of utilization of each of these components.

Further, in many older homes, sink unit drain connections are to wall type drain outlets installed some twenty-four or twenty-five inches above the floor. When a food waste comminuting unit is installed in a conventional sink unit connected to such a wall drain outlet, the level of the discharge outlet of the comminuting unit is well below the level of the wall drain outlet. This situation can be corrected only by undertaking extensive plumbing alterations which are extremely costly.

To overcome such disadvantages and inconvenience I have devised a new type of food preparation work unit; the unit of my construction incorporates several distinct features. Generally, it is comprised of a work-top of counter-top height having a work area contained within and depressed just slightly downwardly of, a rim area. This work area has a surface portion which slopes toward a food waste outlet portion contained within the work area for complete drainage of the work area surface portion. Associated with the food waste outlet portion is a food waste comminuting unit which connects into a building drain. Additionally, I advocate the use of an adequate water supply means with the unit and I suggest the use of a separate but cooperating work surface area member having a surface suitable for cutting foodstuffs.

By using a work-top member of extremely shallow depth I am able to attain certain advantages. First, the work area surface is at counter-top height and is thus located conveniently for a person working immediately at the front thereof in a standing position. Second, the use of a shallow depth work top facilitates the design of a supporting structure that permits use of an extremely convenient and efficient seated work position at the unit. The supporting structure may be provided with an adequate recess for knee clearance; the work area surface is then ideally located with respect to a person sitting thereat for purposes of providing utmost convenience and efficiency.

The work surface area, because it is slightly sloped toward the waste outlet, may additionally be advantageously used as a conventional sink drainboard for those purposes normally associated with the drainboard. However, with my construction there is no danger that drainage or prepared food on the work surface will come into direct contact with matter contained in an adjacently located sink bowl; the rim within which the work surface area is confined prevents such a likelihood.

Additional advantages of the food preparation work unit of my invention relate to its combined use with a food waste comminuting unit. The food waste inlet of such unit is conveniently located for use by a person, either seated or standing, working directly in front of the work surface area. Further, the food waste outlet opening in the work surface area is so located that an installed typical food waste comminuting unit will in no way interfere with the comfortable seating of a person at the work surface area.

Further, in certain instances, use of my invention simplifies the installation of a food waste comminuting unit. First, the comminuting unit may be directly suspended from the work-top. Second, because the food waste inlet opening of the comminuting unit is more nearly located at the counter-top height than it would be if installed at the drain opening of a conventional sink bowl, installation is greatly simplified in those homes that have utilized wall drain openings generally at a height of twenty-four or twenty-five inches above the floor. This type of problem is now solved without having to make extensive and expensive home plumbing alterations.

When the food waste comminuting unit is combined with my food preparation unit work-top and work surface area, operation of the unit is in no manner restricted. Because the comminuting unit is available at all times to fulfill its intended function its worth is greatly increased. Simultaneously, any adjacent sink unit is likewise made fully available to serve its purpose. Interference of functions is eliminated.

Other advantages of my invention become apparent from a study of the details of the description and drawings.

Figure 1:
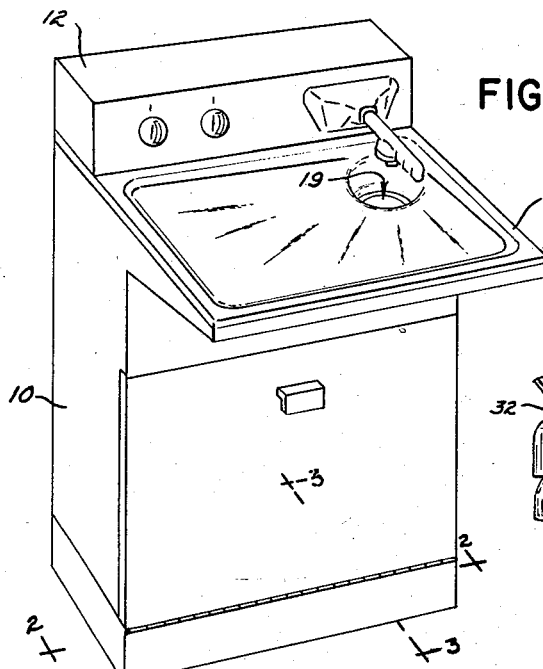
Fig. 1 is a perspective view of the food preparation work unit of my invention showing some of its important features.
Figures 2, 3:
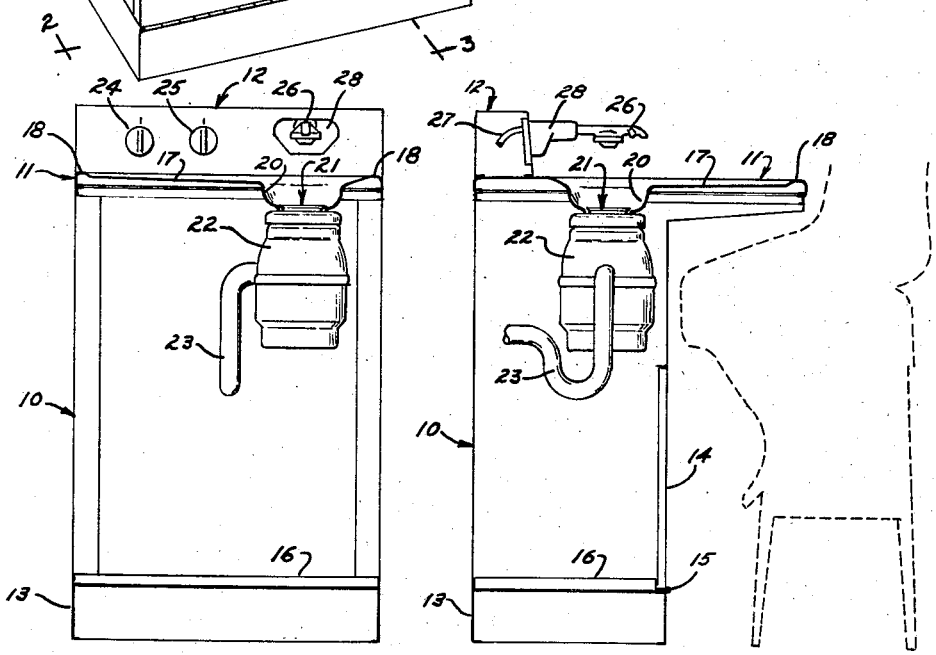
Fig. 2 is a sectional view taken along line 2—2 of Fig. 1.
Fig 3 is a sectional view taken along line 3—3 of Fig. 1.

In Fig. 1 I have illustrated a food preparation work unit generally. In the form shown it is comprised of a sheet metal cabinet structure 10, a work top 11 supported thereon, and a control housing 12. Work-top 11 is provided with a food waste outlet shown generally as 19. Sections through the unit are taken along lines 2—2 and 3—3 and are shown in Figs. 2 and 3.

The cabinet structure 10 is shown as having a supporting sub-base member 13, a floor member 16, and a door 14 secured to the cabinet by hinge 15. The lower interior cabinet portion may serve as storage space. Work top 11 is carried by and secured to cabinet 10 and hence the cabinet must be made sufficiently strong to accommodate the loading normally associated with the work top.

Work top 11 is provided with a work surface 17 which is confined within a rim area 18. The work surface area 17 is depressed only slightly below rim area 18 and is of "counter-top" height with respect to the building floor upon which the unit is situated. Work surface 17 further slopes slightly downward in the direction of food waste outlet 19. As shown in Figs. 1–7, the food waste outlet 19 is provided with a sump portion 20 and outlet opening 21.

I prefer that work top 11 be made of a rigid and totally moisture-resistant material. As shown in the drawings it might be made of a corrosion resistant metal, such as stainless steel, or of porcelain enameled steel. Enameled cast iron would also prove acceptable as would vitreous china and certain types of plastics.

Associated with work top 11 is food waste comminuting unit 22 and control housing 12. The comminuting unit 22 is of a domestic type; its function and usual mode of performance are well known. The inlet opening of comminuting unit 22 registers with the food waste outlet opening 21 of work top 11. The discharge opening of comminuting unit 22 communicates with a trap 23 in the building drain system. As shown in Figs. 2, 3, 6 and 7, the trap leads to a wall type drain opening; as an alternate installation the trap might discharge into a floor drain opening. Comminuting unit 22 is supported by and from work top 11 in a manner which later will be described more fully.

Control housing 12 serves to house and support controls shown generally as 24 and 25 and spray head 26. Control 24 might be operatively connected to comminuting unit 22 and may serve either as a simple on-off electrical switch or as a combined timer and switch; details of the electrical connections to the control, comminuting unit, and electrical energy source might readily be worked out by persons skilled in the art and hence are not shown. Control 25 might be operatively connected to a typical domestic source of pressurized hot and cold water (not shown) and serve to regulate the quantity and temperature quality of water passing to spray head 26. Details of the construction of control 25 are not here shown.

Spray head 26 is preferably supplied with water from control member 25 through a length of flexible hose or tubing 27 which, through a yieldable mechanical arrangement (not shown), is kept in tension at all times. With this preferred form of construction, spray head 26 may be temporarily removed from its supporting socket 28 by a slight force and moved to any desired location over work surface area 17 for use; upon release of that moving force spray head 26 will naturally tend to return to its initial position.

In Fig. 3 I additionally illustrate, with a dotted line, the relative position of a person seated directly in front of the food preparation work unit. It may be noted that by using an extremely shallow work top the supporting cabinet may be recessed to provide more than ample "knee clearance" for a person assuming the sitting position. Additionally, all portions of the work surface area are convenient to the reach of that seated person as they are likewise to a person standing at the same place. The work surface area is provided with inherent draining characteristics and the inlet to the food waste comminuting unit is likewise very conveniently located. All control members and the water supply source are readily available and within the normal reach of the person using the food preparation work unit. The rim portion fully contains the drain water, food waste, and prepared foodstuffs located thereon. Certain of these advantages will be more fully explained with respect to other of the drawings.

Figure 4:
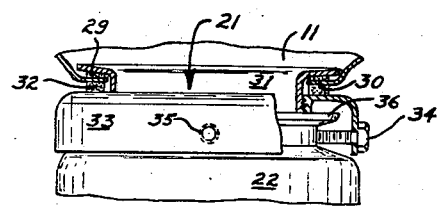
Fig. 4 illustrates, in detail, a method of securing a food waste comminuting unit to the work surface area of the food preparation work unit.

In Fig. 4 a method of securing food waste comminuting unit 22 to work top 11 at food waste outlet opening 21 is shown in detail. As shown, an upper gasket member 29 is located intermediate flange 30, which defines the outlet opening of work top 11, and mounting sleeve 31, the lower exterior portion of which is provided with screw threads. A lower gasket member 32 is likewise interposed between flange 30 and mounting ring 33 which is provided with screw threads on a downturned interior flange thereof which cooperate with the screw threads of the mounting sleeve 31. As mounting ring 33 is rotationally engaged with mounting sleeve 31, gaskets 29 and 32 are compressed and a rigid and leak-proof assembly results. To complete the assembly of comminuting unit 22 to the work top, mounting bolts such as 34 are threaded through openings such as 35 in the mounting ring and the bolts are engaged with the housing of comminuting unit 22 below its outturned flange 36. With an arrangement of this nature comminuting unit 22 may be rigidly secured to work top 11 at its food waste outlet opening.

Figure 5:
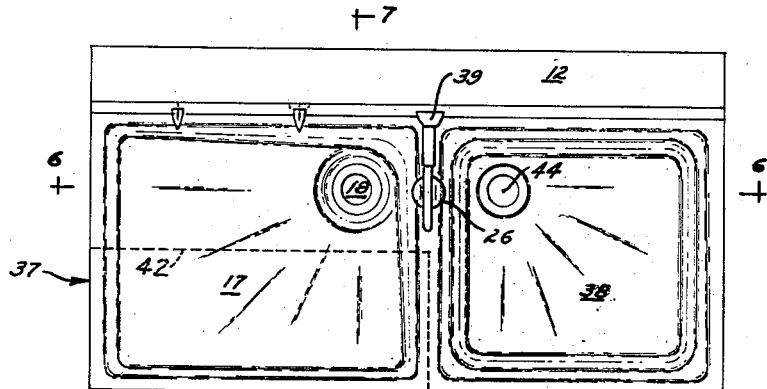
Fig. 5 is a plan view of an alternate form of food preparation work unit incorporating my invention.
Figure 6:
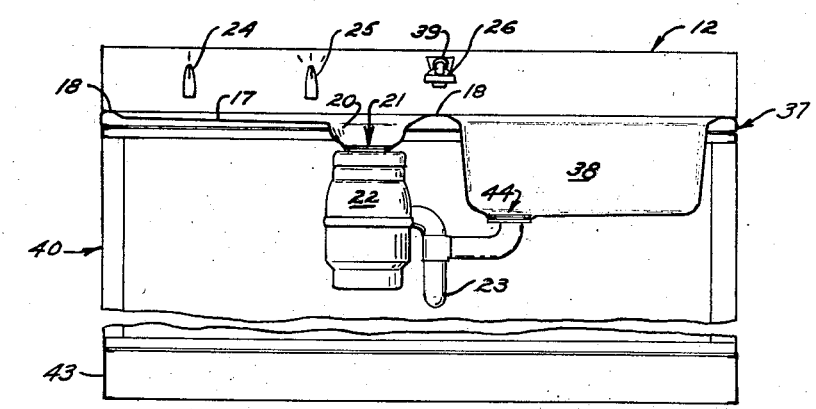
Fig. 6 is a sectional view taken along line 6—6 of Fig. 5.
Figure 7:
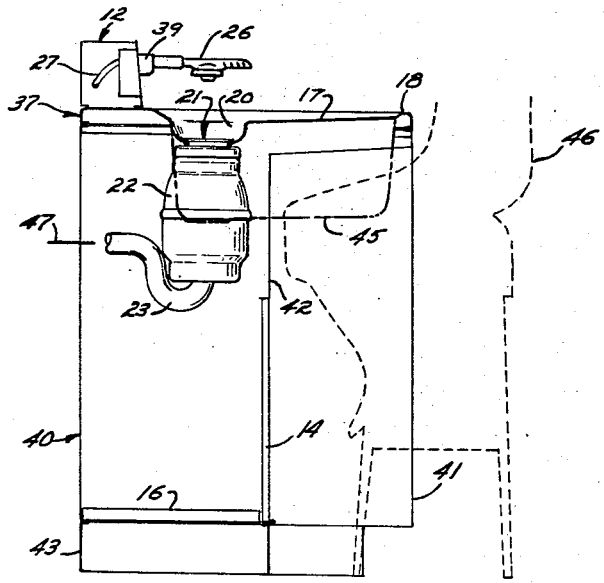
Fig. 7 is a sectional view taken along line 7—7 of Fig. 5.

An alternate form of food preparation work unit is illustrated in Figs. 5 through 7; it is in most respects similar to the form of Figs. 1 through 3 save that the work top 37 is provided with an integral conventional type sink bowl 33. Control housing 12 with its controls 24 and 25 and spray head 26 are equivalent in function to the like components above described. Supporting socket 39 is similar to supporting socket 28 save that it may be horizontally rotated to permit the location of spray head 26 over the outlet opening of either work surface 17 of sink bowl 38.

Cabinet 40 is similar in function and construction to cabinet structure 10; because of the depth of sink bowl 38 the front vertical face portion 41 of the unit is flush with the front edge of the work top at the sink portion thereof—the remaining front vertical surface portion 42 is set back as shown in Fig. 7 and by the dotted line of Fig. 5 to provide the necessary degree of knee clearance. It is only because of the extremely shallow depth of work surface 17 that this arrangement is made possible.

Sub-base 43 is similar in function to sub-base 13. Installation of food waste comminuting unit 22 and the associated drain trap 23 is in the manner previously described save that drain opening 44 of sink bowl 38 is additionally plumbed into the drain system.

In Fig. 7 I have additionally shown with dot-dash-dot line 45 the profile outline of sink bowl 38 and with dotted line 46 the outline of a person seated at the food preparation work unit immediately in front of work surface area 17. It can be observed in Fig. 7 that the bottom of sink bowl 38 would interfere with body portions of a person seated in front of the sink bowl. Even though recessing of the supporting cabinet structure of a conventional sink unit below the level of the bottom of the sink bowl may be desirable with respect to the convenience of a person standing immediately at the front thereof, it is totally inadequate with respect to a person seated at that place.

Fig. 7 more fully illustrates the advantage of my invention as to installation of the comminuting unit 22. Were this unit to be mounted at drain outlet 44 of sink bowl 38 its elevation with respect to the floor would be greatly reduced. As previously explained, in many cases the building drain has a wall opening twenty-four to twenty-five inches above the floor. This level corresponds generally to the level 47 shown in Fig. 7. Hence, with an installation of comminuting unit 22 at the sink bowl drain outlet 44 the discharge of the unit may be well below level 47. With the unit of my invention, expensive plumbing alteration costs may, in some cases, be avoided.

From the disclosure of Figs. 5 through 7 it becomes apparent that, in addition to the above cited advantages, the food preparation work unit of my invention has additional advantages. First, there is no likelihood that drainage or waste matter or prepared foodstuffs can pass over into the sink bowl. Second, drainage facilities and water supply facilities are immediately available within the confines of or adjacent to work surface area 17.

It further becomes apparent that comminuting unit 22 and sink bowl 38 may each be used independently of the other and hence there is no possibility that use of the one will prevent simultaneous use of the other.

Figure 8:
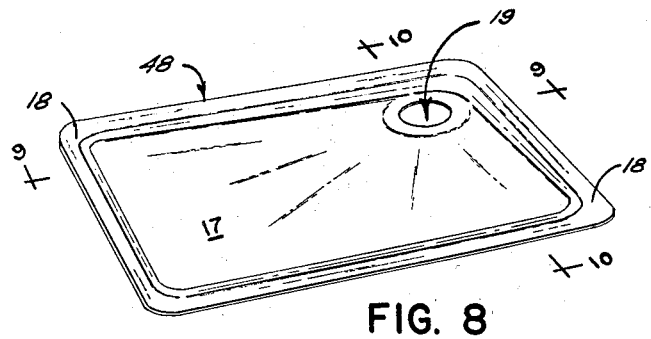
Fig. 8 shows, in perspective, an alternate form of a work-top surface area for a food preparation work unit.
Figure 9:
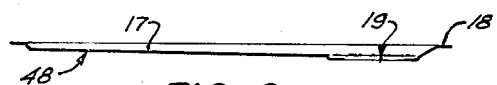
Fig. 9 is a section taken at line 9—9 of Fig. 8.
Figure 10:
Fig. 10 is a section taken at line 10—10 of Fig. 8.

Fig. 8 illustrates work top 48 which is somewhat similar to work top 11 of Figs. 1 through 3. However, the form here shown is of a flat-rim or drop-in type and integral flanged edges are not provided. This form of work top is preferably constructed of the materials previously described and may be supported in a counter-top or the like by any conventional flat rim sink supporting frame member. Also, the flat rim feature may be used with the form of work top shown in Figs. 5 through 7.

Work top 48 differs from the form of work tops 11 and 37 in another respect. Its food waste outlet 19 is not provided with a sump portion, such as 20 of Figs. 2, 3, 6 and 7. The necessity or desirability of a sump 20 is largely determined by the presence of certain construction features in the domestic type food waste comminuting unit.

Many of such units are provided with a flexible splash-baffle at their inlet opening and a slight force must be exerted upon solid waste matter to cause it to pass into the units' comminuting chamber. Sump 20 is utilized to permit the accumulation of a "batch" of food waste matter prior to its being charged into the food waste comminuting unit. With this arrangement small amounts of food waste matter need not immediately be fed into the unit; because most food waste comminuting units are designed for batch type operation rather than continuous feed operation, the sump feature of my work top is highly desirable.

The arrangement of food outlet portion 19 of work top 48 is particularly suitable for use with food waste comminuting units of the type not provided with or not requiring a splash-baffle. Another advantage of this form of work top lies in the fact that the discharge outlet of the comminuting unit will be located at a still higher level with respect to the building wall drain outlet.

Figure 11:
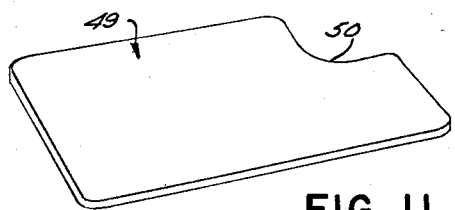
Fig. 11 is a perspective view of a cutting board or the like which may be advantageously used with the work surface area of my invention.

In Fig. 11 I illustrate a form of cutting board 49 or the like which is extremely adaptable to use with the food preparation work unit of my invention. Cutting board 49 may be made of wood or other resilient material suitable for a cutting surface. Cutting board 49 is to be of a thickness approximately equal to the distance which work area surface portion 17 is depressed downward of rim area 18. Member 49 is provided with a notched or relieved portion 50 which registers with and is coextensive with food waste outlet portion 19 of the work top.

Figure 12:
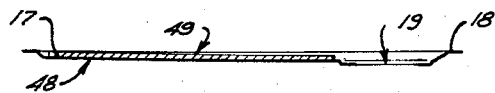
Fig. 12 is a sectional view, somewhat similar to Fig. 9, showing the component of Fig. 11 in cooperating relationship with the work-top of Fig. 8.

Cutting board 49 cooperates with work area surface portion 17 in the manner illustrated by Fig. 12. When properly engaged therewith it provides a cutting surface of counter-top height. Drainage facilities and other features of the work unit are in no way interfered with.

As my invention, I claim:

1. In a food preparation work unit, the combination comprising a frame, a work top having a counter top height mounted on said frame, said top being generally flat and imperforate throughout its major extent and generally rectangular, said top being generally horizontal and inclined slightly downwardly toward a rear corner thereof and having a food waste discharge opening in said rear corner, said top having an integral annular flange extending generally horizontally and radially inwardly of said opening, a food comminuting unit mounted on said flange, a sink top mounted on said frame adjacent said work top, said sink top being generally rectangular and having a depressed portion with a depth several times the depth of said depressed portion of said work top, said sink having a discharge opening therein, the top of said food comminuting unit being at a level above the bottom of said sink, an integral rim extending upwardly from the entire periphery of said work top and separating said work top on the side adjacent said sink from said sink, said work top being spaced from the upper edge of said rim sufficiently to form a shallow work area and insufficiently to form a sink.

2. The combination set forth in claim 1 wherein the distance between the underside of said unit between the said work top and the floor is sufficient to permit a person to be seated on a stool with the knees projecting below said work top.

3. The combination set forth in claim 1 wherein said work top and said sink are mounted on a generally rectangular cabinet, the width of the cabinet being less than the width of the work top in the area of the work top whereby more than half of the work top projects forwardly beyond the periphery of the cabinet to provide a recess below the projecting portion of the work top for receiving the knees of a person seated adjacent said unit.

4. In a food preparation work unit, the combination comprising a frame, an imperforate work top having a counter top height mounted on said frame, said work top being generally flat throughout its major extent and generally rectangular, an integral rim extending upwardly from around the entire periphery of said work top, said work top being generally horizontal and inclined slightly downwardly toward one corner thereof, said work top being spaced from the upper edge of said rim sufficiently to form a shallow work area and insufficiently to form a sink, said work top having a food waste discharge opening in said one corner, a generally symmetrical annular depressed portion in said work top surrounding said opening providing a sump having a depth greater than the depth of said work area below said rim, an integral annular flange on said work top extending generally horizontally and radially inwardly from said depressed portion to provide a combined discharge opening and support for a food comminuting unit.

5. In a compact food preparation work unit, the combination comprising a cabinet, an imperforate work top having a counter top height mounted on said frame, said top being generally flat throughout its major extent and generally rectangular, an integral rim extending upwardly from around the entire periphery of said work top, said work top being generally horizontal and inclined slightly downwardly toward one corner thereof, said work top being spaced from the upper edge of said rim sufficiently to form a shallow work area and insufficiently to form a sink, said top having a food waste discharge opening in said one corner, an integral annular flange on said work top extending generally horizontally and radially inwardly of said discharge opening to provide a combined discharge opening and support for a food comminuting unit, said work top overlying a portion of said cabinet and having a substantial part thereof extending forwardly beyond the periphery of said cabinet to provide a recess below the extending portion of said work top for receiving the knees of a person working at said work unit.

6. The combination set forth in claim 5 including a generally symmetrical annular depressed portion in said work top surrounding said flange of said opening and forming a sump, the depth of said depressed portion being greater than the distance between said rim and said work top.

References Cited in the file of this patent

UNITED STATES PATENTS

| 508,885 | Johnston | Nov. 14, 1893 |
| 511,048 | Groves | Dec. 19, 1893 |
| 858,926 | Vanderman | July 2, 1907 |
| 1,191,088 | Mercer | July 11, 1916 |
| 1,804,715 | Tafel | May 12, 1931 |
| 1,830,781 | Brotz | Nov. 10, 1931 |
| 1,968,515 | Coble et al. | July 31, 1934 |
| 2,334,293 | Stein | Nov. 16, 1943 |
| 2,339,647 | Meyer | Jan. 18, 1944 |
| 2,391,034 | O'Brien | Dec. 18, 1945 |
| 2,426,152 | Meldahl | Aug. 19, 1947 |
| 2,498,502 | O'Brien | Feb. 21, 1950 |
| 2,609,024 | Russ | Sept. 2, 1952 |

FOREIGN PATENTS

| 184,572 | Switzerland | Jan. 16, 1937 |
| 531,506 | Great Britain | Jan. 6, 1941 |
| 1,081,936 | France | June 16, 1954 |